US012804403B2

(12) United States Patent
Bhagavathiperumal et al.

(10) Patent No.: US 12,804,403 B2
(45) Date of Patent: Nov. 17, 2026

(54) SYSTEM AND METHOD FOR THREAT DETECTION AND SIM CLONING IN TELECOMMUNICATION MONITORING INFRASTRUCTURE

(71) Applicant: Aviz Networks, Inc., San Jose, CA (US)

(72) Inventors: Chidambaram Bhagavathiperumal, Livermore, CA (US); Harrish Subramaniam Jeyabalu, Coimbatore (IN); Ilanchezhian Raman, Chennai (IN); Sutharsan Srinivasan, Chennai (IN)

(73) Assignee: Aviz Networks, Inc., San Jose, CA (US)

( * ) Notice: Subject to any disclaimer, the term of this patent is extended or adjusted under 35 U.S.C. 154(b) by 21 days.

(21) Appl. No.: 19/043,969

(22) Filed: Feb. 3, 2025

(65) Prior Publication Data

US 2026/0230830 A1 Aug. 6, 2026

(51) Int. Cl.

| | |
|---|---|
| ***H04W 12/72*** | (2021.01) |
| ***H04W 8/20*** | (2009.01) |
| ***H04W 12/104*** | (2021.01) |
| ***H04W 12/121*** | (2021.01) |

(52) U.S. Cl.

CPC ............ *H04W 12/72* (2021.01); *H04W 8/20* (2013.01); *H04W 12/104* (2021.01); *H04W 12/121* (2021.01)

(58) Field of Classification Search

CPC . H04W 12/72; H04W 12/121; H04W 12/104; H04W 8/20

USPC ........................................................... 726/23

See application file for complete search history.

(56) References Cited

U.S. PATENT DOCUMENTS

| | | | | |
|---|---|---|---|---|
| 2014/0113653 | A1* | 4/2014 | Wendling | H04W 68/02 455/456.1 |
| 2016/0173509 | A1* | 6/2016 | Ray | H04L 63/1425 726/23 |
| 2018/0278640 | A1* | 9/2018 | Modani | G06F 16/9024 |
| 2019/0304104 | A1* | 10/2019 | Amer | G06F 40/216 |
| 2020/0167786 | A1* | 5/2020 | Kursun | H04L 63/08 |
| 2021/0203710 | A1* | 7/2021 | Burnette | H04L 47/11 |
| 2023/0269264 | A1* | 8/2023 | Yao | G06F 11/3438 726/23 |

(Continued)

*Primary Examiner* — Anthony D Brown

(74) *Attorney, Agent, or Firm* — Select IP Law Corporation; Ashkon Cyrus

(57) ABSTRACT

In some implementations, the device may include populating, by a control node, a control database with subscriber control information based on a plurality of targeted data packets received from an N11/S11 interface. In addition, the device may include appending timestamp information derived from the plurality of targeted data packets. The device may include fetching subscriber control information from the control database. Moreover, the device may include tracking subscriber transitions between coverage areas of different towers to create subscriber handover data including user location information. Also, the device may include correlating incoming user plane packets with corresponding subscriber information. Further, the device may include generating an alert of a detected threat when a packet from an IMSI/IMEI is received at approximately the same time from two or more different locations.

15 Claims, 4 Drawing Sheets

(56) References Cited

U.S. PATENT DOCUMENTS

| | | | | |
|---|---|---|---|---|
| 2023/0281310 | A1* | 9/2023 | Chen | G06N 3/0475<br>726/24 |
| 2023/0306489 | A1* | 9/2023 | Kong | G06N 5/04 |

* cited by examiner

SYSTEM AND METHOD FOR THREAT DETECTION AND SIM CLONING IN TELECOMMUNICATION MONITORING INFRASTRUCTURE

BACKGROUND

SIM card cloning is a significant issue today, causing billions of dollars in losses annually and posing financial and privacy risks. SIM card cloning involves duplicating a SIM card's unique information onto a new card, enabling hackers to access the victim's mobile network. This malicious act can lead to unauthorized access to personal data, financial accounts, and sensitive communications.

Victims of SIM cloning often face severe financial losses, identity theft, and breaches of privacy and it causes a lot of problems in the world. The impact is not only limited to individuals but also affects businesses, causing disruptions, loss of customer trust, and significant financial damage.

Current methods to combat SIM card cloning are inadequate because they do not address the source of the problem. Traditional defenses like radio fingerprint matching and two-factor authentication do offer an added layer of protection, but they fall short of providing a comprehensive solution because they are reactive rather than proactive, addressing the problem only after it has occurred. Moreover, they do not natively integrate with existing network monitoring systems, leaving gaps that can be exploited by attackers to gain unauthorized access to mobile networks.

Therefore, there is an urgent need for more robust and integrated security solutions to effectively combat the pervasive threat of SIM card cloning.

SUMMARY

Embodiments of the present disclosure pertain to network visibility solutions within telecommunications monitoring infrastructure. In one embodiment, network data is utilized and intercepted by various nodes to effectively identify occurrences of SIM cloning. This session-based approach enhances overall network security and integrates natively with existing network monitoring technologies. The security systems and methods described in this disclosure can operate independently or be combined with additional detection methodologies for enhanced efficacy. A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions.

In one general aspect, method may include populating, by a control node, a control database with subscriber control information based on a plurality of targeted data packets received from an N11/S11 interface. Method may also include appending timestamp information derived from the plurality of targeted data packets. Method may furthermore include fetching subscriber control information from the control database. Method may in addition include tracking subscriber transitions between coverage areas of different towers to create subscriber handover data including user location information. Method may moreover include correlating incoming user plane packets with corresponding subscriber information. Method may also include generating an alert of a detected threat when a packet from an IMSI/IMEI is received at approximately the same time from two or more different locations. Other embodiments of this aspect include corresponding computer systems, apparatus, and computer programs recorded on one or more computer storage devices, each configured to perform the actions of the methods.

Implementations may include one or more of the following features. Method where the control node further may include instructions to verify integrity of the subscriber control information by cross-referencing with a location database. Method where the alert generated includes details of the detected threat, including timestamp, location data, and subscriber identity information. Method may include the step of updating the control database with resolved discrepancies in user location data upon validation. Method where the control node utilizes Handover/Location Identification algorithms to predict potential handover events and preemptively update subscriber information. Implementations of the described techniques may include hardware, a method or process, or a computer tangible medium.

The method may include several key features. The control node might verify the integrity of subscriber information by cross-referencing it with a location database. If a threat is detected, the alert will provide details such as the timestamp, location data, and subscriber identity information. The system also updates the control database with any discrepancies in user location data once validated. Additionally, the control node uses Handover/Location Identification algorithms to predict potential handover events and update subscriber information in advance.

The method may further include verifying the subscriber control information's integrity through a location database. When an alert is generated, it contains critical details like the timestamp, location data, and subscriber identity information. The processors can also update the control database with validated discrepancies in user location data. Handover Identification algorithms help the control node predict handover events and preemptively update subscriber information. These techniques can be implemented in hardware, software, or a combination of both.

In another aspect, the control node verifies subscriber information by checking it against a location database. The alert, if generated, includes the threat's timestamp, location data, and subscriber identity information. The system also updates the control database with any discrepancies in user location data after validation. Further, Location Identification algorithms allow the control node to foresee potential handover events and update subscriber information accordingly. These implementations can be in hardware, software, or both.

According to an embodiment of the present disclosure a service node is provided to extract mobile traffic data. Mobile traffic data extracted can include subscriber aware correlated information, International mobile subscriber identity, timestamp, International mobile equipment identity as well as user location information such as cell ID, tracking area, and routing area.

By leveraging network data intercepted by these nodes, the system can effectively identify instances of SIM cloning, enhancing overall network security and integrating seamlessly with existing network monitoring technologies, thus obviating the need for separate detection methodologies.

DETAILED DESCRIPTION

The methods and systems described herein present an innovative detection methodology integrated into network visibility solutions within telecommunications monitoring infrastructure, specifically utilizing Service Nodes.

Figure 1:
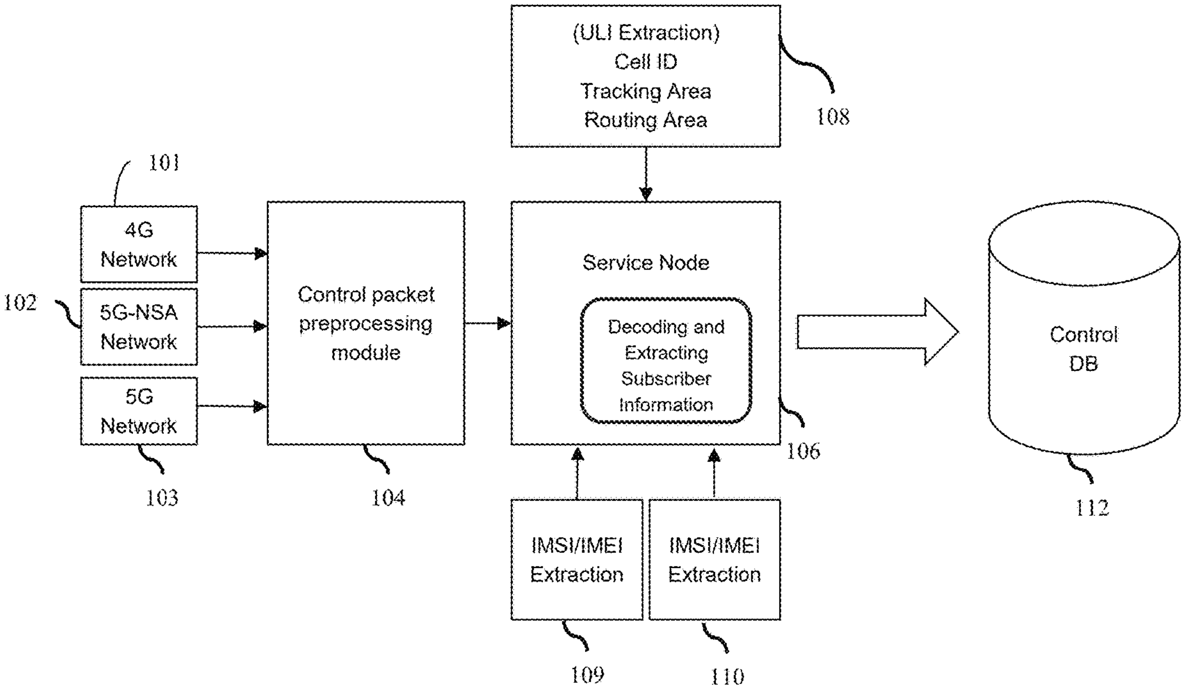
FIG. 1 illustrates an architecture for extracting subscriber control information.

FIG. 1 illustrates an architecture for extracting subscriber control information to be used in threat detection. According to an embodiment of the present disclosure preprocessing module 104 plays a crucial role in this system by handling data from three distinct networks: the 4G network 101, the 5G-NSA (Non-Standalone) network 102, and the 5G network 103. The 4G network represents the fourth generation of mobile telecommunications technology, offering improved speed and capabilities over its predecessors. The 5G-NSA network is a transitional network that leverages existing 4G infrastructure while incorporating new 5G components to enhance performance. Preprocessing module 104 may be configured to input data from other mobile networks as well.

Control Packet Preprocessing Module 104 is crucial for managing signaling traffic between the network components in telecom systems like 5G (N11/N4 interfaces) and LTE (S11 interface). Its primary job is to process incoming control packets, ensuring they are valid, correctly routed, and ready for downstream functions. This involves handling protocols like HTTP/2 and JSON for N11, PFCP for N4, and GTP-C for S11. These protocols enable communication between network functions, such as the AMF and SMF in 5G or the MME and SGW in LTE.

In a hardware implementation according to an embodiment of the present disclosure, the preprocessing module 104 utilizes DPDK (Data Plane Development Kit) to accelerate packet processing tasks. DPDK is a set of libraries and drivers for fast packet processing, enabling the module to efficiently handle parsing, validation, and routing of control packets. By leveraging DPDK, the module can achieve lower latency and higher throughput compared to traditional methods. The DPDK-enabled module operates on multi-core processors that manage higher-level protocol operations and decision-making processes. This approach ensures robust and scalable performance. The preprocessing module also includes high-speed memory for temporary storage of packet data and buffering during peak traffic periods. In an alternative embodiment, preprocessing module 104 is implemented via software.

Additionally, the module is equipped with multiple network interfaces to support concurrent connections to the 4G, 5G-NSA, and 5G networks. These interfaces are designed to handle high bandwidth and provide seamless integration with existing telecom infrastructure.

Once the preprocessing module 104 has processed the incoming data from these networks, it forwards the information to the service node 106. This node is responsible for decoding and extracting subscriber information that is vital for managing and delivering services. The service node receives additional data from the ULI (User Location Information) Extraction module 108, which identifies and processes location-related information of subscribers, and the IMSI (International Mobile Subscriber Identity)-IMEI (International Mobile Equipment Identity) Extraction modules 109 and 110, which are tasked with extracting unique identifiers associated with both the subscriber and their device.

The IMSI is a unique number identifying a mobile subscriber within the mobile network, whereas the IMEI is a unique identifier assigned to mobile devices. These identifiers are essential for various network operations, including authentication, billing, and tracking of mobile devices.

Service node 106 is further confirmed to add time stamp information and then the extracted subscriber information is stored in the control database 112. It can be appreciated that such an approach enhances packet metadata by appending timestamp information which is derived from processing the tapped packets, according to an embodiment. Control database 112 serves as the central repository where all the decoded and processed subscriber control information is kept. The control database ensures that the data is readily accessible and can be used for various purposes, such as enhancing customer service, managing network resources more efficiently, and providing detailed analytics for network operators.

Service Node 106 may be implemented as a high-performance software solution specifically designed for advanced telecommunications network monitoring. The service node is configured to facilitate real-time packet processing, traffic analysis, and data correlation, providing comprehensive network visibility along with subscriber-aware intelligence.

The implementation of Service Node 106 may comprise high-performance servers equipped with multi-core processors, ample RAM, and high-speed storage to efficiently handle intensive data processing tasks. It may also include a robust and stable operating system such as Linux, known for its reliability and compatibility with networking and telecommunication applications. Virtualization technologies like Docker or Kubernetes facilitate the deployment, scaling, and management of containerized applications. Advanced network interface cards (NICs) and software-defined networking (SDN) solutions ensure seamless integration with 4G, 5G-NSA, and 5G networks.

High-performance middleware such as Apache Kafka for real-time data streaming and Apache Pulsar for message brokering and processing are used. Data processing may be done using a combination of DPDK for low-latency hardware-accelerated packet processing and multi-core CPUs for complex decision-making tasks. Highly scalable and low-latency databases such as Apache Cassandra or Redis are used for efficient storage and retrieval of subscriber data and control information. Robust security protocols and tools such as SSL/TLS for secure data transmission and security system solutions protect the infrastructure. Comprehensive monitoring and management tools like Prometheus and Grafana ensure the health and performance of the Service Node and its components.

This architecture empowers Service Node 106 to handle the demanding requirements of modern telecommunication networks, ensuring accurate processing, real-time data analysis, and efficient management of subscriber information.

In summary, the architecture depicted in FIG. 1 outlines a sophisticated system for processing and managing subscriber control information across different generations of mobile networks. Each component—from the preprocessing module to the extraction modules and the control database—plays a vital role in ensuring that subscriber data is accurately decoded, extracted, and stored for optimal network operation and service delivery.

Figure 2:
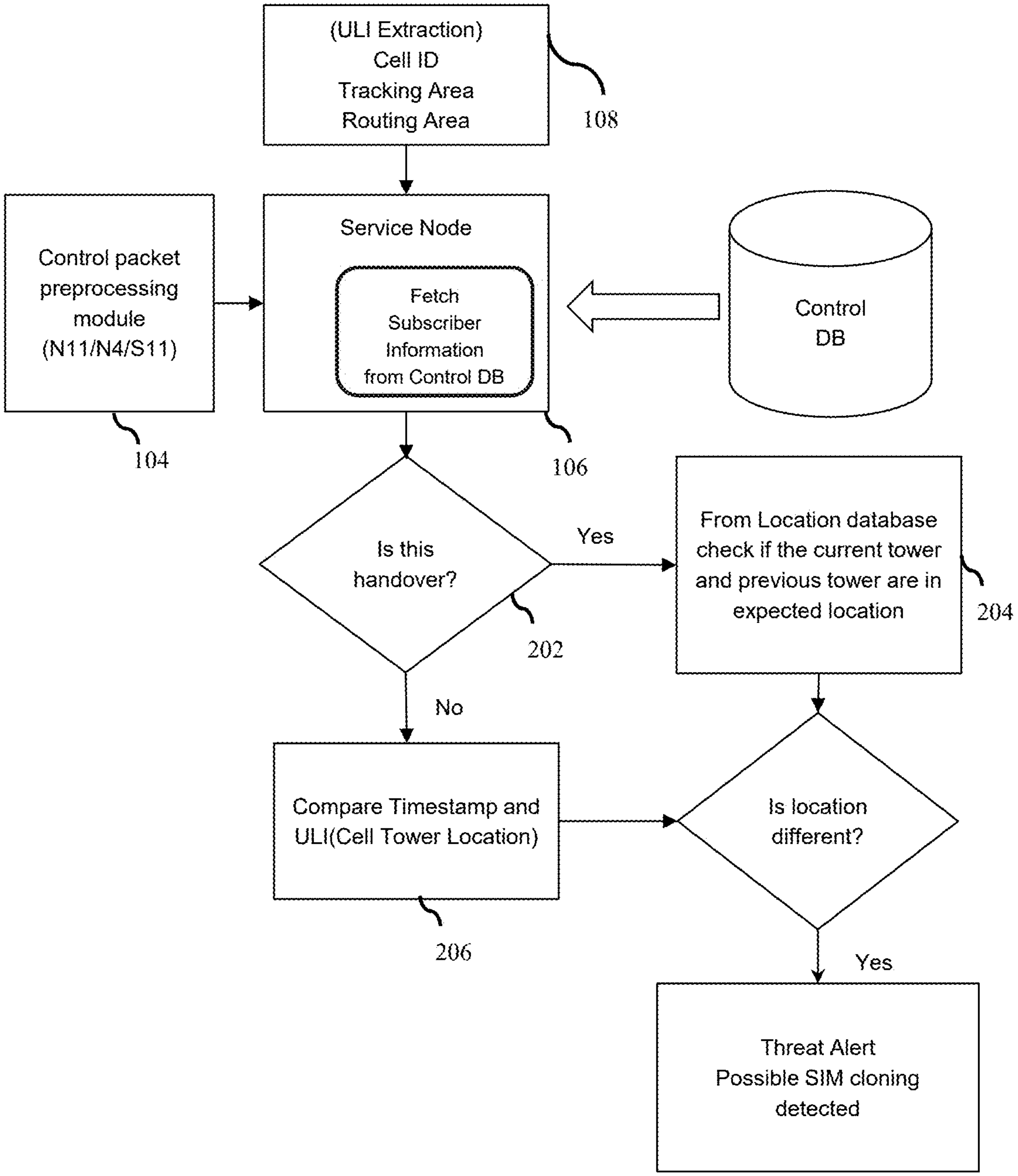
FIG. 2 illustrates the Service Node 106 retrieving subscriber information from the Control Database (Control DB) to enable key network functions.

FIG. 2 illustrates the Service Node 106 retrieving subscriber information from the Control Database (Control DB) to enable key network functions. According to an embodiment of the present disclosure upon receiving a signaling request, such as session initiation or mobility management, the Service Node queries the Control DB for necessary subscriber data. Subscriber data can include profiles, QoS parameters, and current session states. According to an embodiment of the present disclosure the service node stores into a Control Database (DB) which is populated based on packets from the N11/S11 interface. This enables the service node in later steps to correlate incoming user plane packets with stored subscriber information by fetching pertinent data.

According to an embodiment of the present disclosure the Service node then executes instructions which determine when a handover 202 has occurred, in which case if a handover has occurred then the service node will first verify whether the current and previous towers are in the expected locations by consulting the Location database. If the location is found to be different, the service node will issue a Threat Alert for potential SIM cloning detection.

If A handover 202 has not occurred, however, then the service node will compare timestamp and ULI (Cell tower location) and if the location If the location is found to be different, the service node will issue a Threat Alert for potential SIM cloning detection.

According to an embodiment of the present disclosure, the Service Node executes instructions to determine if a handover has occurred. A handover refers to the process where an ongoing call or data session is transferred from one cell tower to another as a user moves through different coverage areas.

According to an embodiment of the present disclosure to determine if a handover has occurred, the Service Node follows these steps. First, the Service Node continuously monitors the signal strength of the current cell tower. A significant drop in signal strength could indicate that the user is moving away from the current tower.

Next, the Service Node receives handover requests from the mobile device or the network's base stations. These requests contain information about the new target cell tower to which the connection should be transferred. Then, the Service Node compares the unique identifiers of the current and target cell towers. A change in these IDs confirms that a handover is required. The Service Node also cross-references the location data of the current and target towers with the expected geographical locations stored in the Location Database.

This step ensures that the handover is legitimate and within the expected movement trajectory of the user. Additionally, the Service Node checks the timestamps of the handover events. It ensures that the timestamps are sequential and within a plausible time for the user's movement.

If the Service Node determines that a handover has indeed occurred, it will proceed with the following actions. The Service Node updates the subscriber's current location and session data in the Control Database. It verifies the integrity of the handover by cross-referencing the subscriber's control information with the Location Database.

If any discrepancies are found, such as unexpected locations or simultaneous connections from two distinct locations, a Threat Alert for potential SIM cloning detection is issued. Finally, the Service Node executes the handover by re-routing the ongoing call or data session to the new cell tower, ensuring seamless connectivity for the user.

Figure 3:
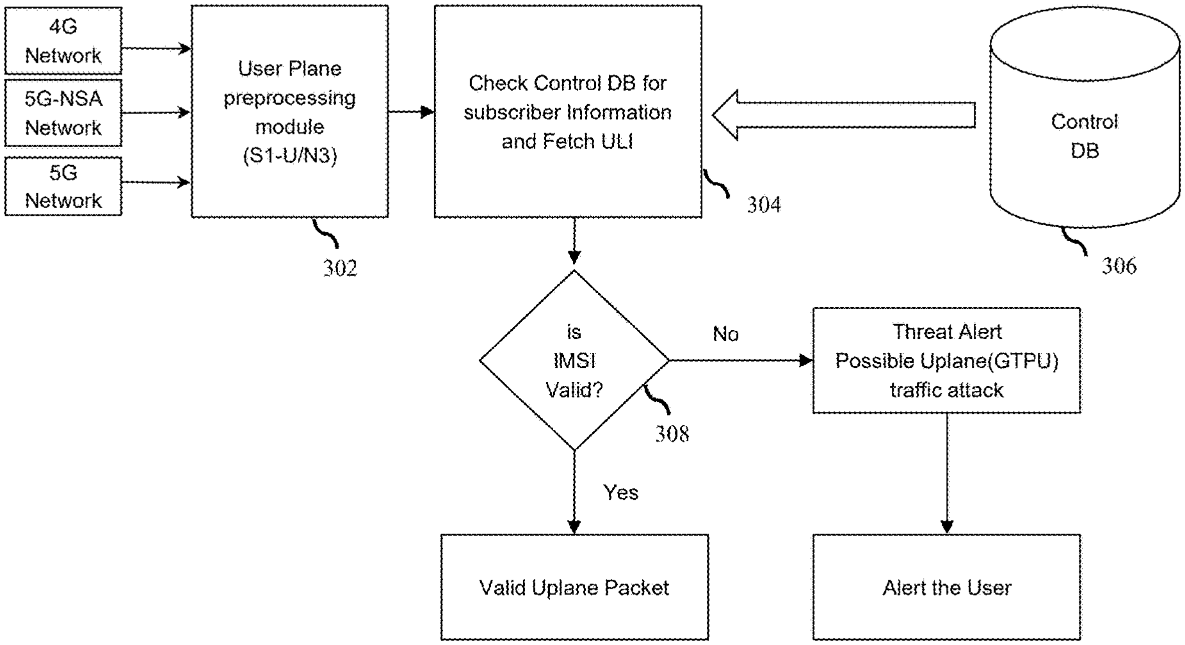
FIG. 3 illustrates an architecture for subscriber uplink threat detection.

According to an embodiment of the present disclosure, the method correlates the packets and generates alert when a packet from a single IMSI or IMEI is received around the exact same timestamp carrying two or more different User Location information (ULIs), FIG. 3 explains subscriber uplink threat detection. The service node 304 receives user plan information from user plane preprocessing module (S1-U/N3) and checks the Control DB 306 for subscriber information and retrieves the ULI. If the IMSI is valid, the uplink packet is valid. If not, it may indicate a potential uplink traffic attack, and an alert is issued.

FIG. 3 explains subscriber uplink threat detection. The service node 304 receives user plane information from the user plane preprocessing module 302 and checks the Control DB 306 for subscriber information and retrieves the ULI. If the IMSI is valid, the uplink packet is valid. If not, it may indicate a potential uplink traffic attack, and an alert is issued.

In more detail, the process begins when the service node receives user plane packets that contain the data traffic generated by the subscriber's device. These packets are then forwarded to the user plane preprocessing module, which analyzes and prepares the data for further processing.

Once the preprocessing is complete, the user plane packets, along with their associated metadata, are sent to the service node. Here, the service node queries the Control Database (Control DB) 306 to fetch the corresponding subscriber information, including the User Location Information (ULI) and International Mobile Subscriber Identity (IMSI).

The validity of the IMSI is a critical factor in this step. The IMSI is a unique identifier assigned to each subscriber within a mobile network. By cross-referencing the IMSI with the Control DB, the service node confirms whether the packet originates from a legitimate and authorized subscriber. If the IMSI is found to be valid, the packet is deemed authentic, and the uplink communication is allowed to proceed.

However, if the IMSI does not match any records in the Control DB or appears suspicious, this discrepancy raises an immediate red flag. It suggests the possibility of an uplink traffic attack, where an unauthorized entity is attempting to transmit data into the network. In such cases, the service node triggers a threat alert, signaling network administrators to investigate and mitigate the potential security breach.

This mechanism plays a pivotal role in maintaining the security and integrity of the network. By ensuring that only authorized subscribers can transmit data, the network is safeguarded against malicious activities such as spoofing, unauthorized access, and other cyber threats. Consequently, the network infrastructure and user data remain protected from potentially harmful intrusions.

Subscriber uplink threat detection is crucial in maintaining the security and integrity of a network. By verifying the International Mobile Subscriber Identity (IMSI) against the Control Database (Control DB), the service node ensures that only authorized and legitimate subscribers are transmitting data. This process helps prevent malicious activities such as spoofing or unauthorized access, which can lead to data breaches, service interruptions, or other cybersecurity incidents.

The potential detection of an uplink traffic attack allows network administrators to respond promptly to threats, safeguarding both the network infrastructure and user data from potentially harmful intrusions.

Figure 4:
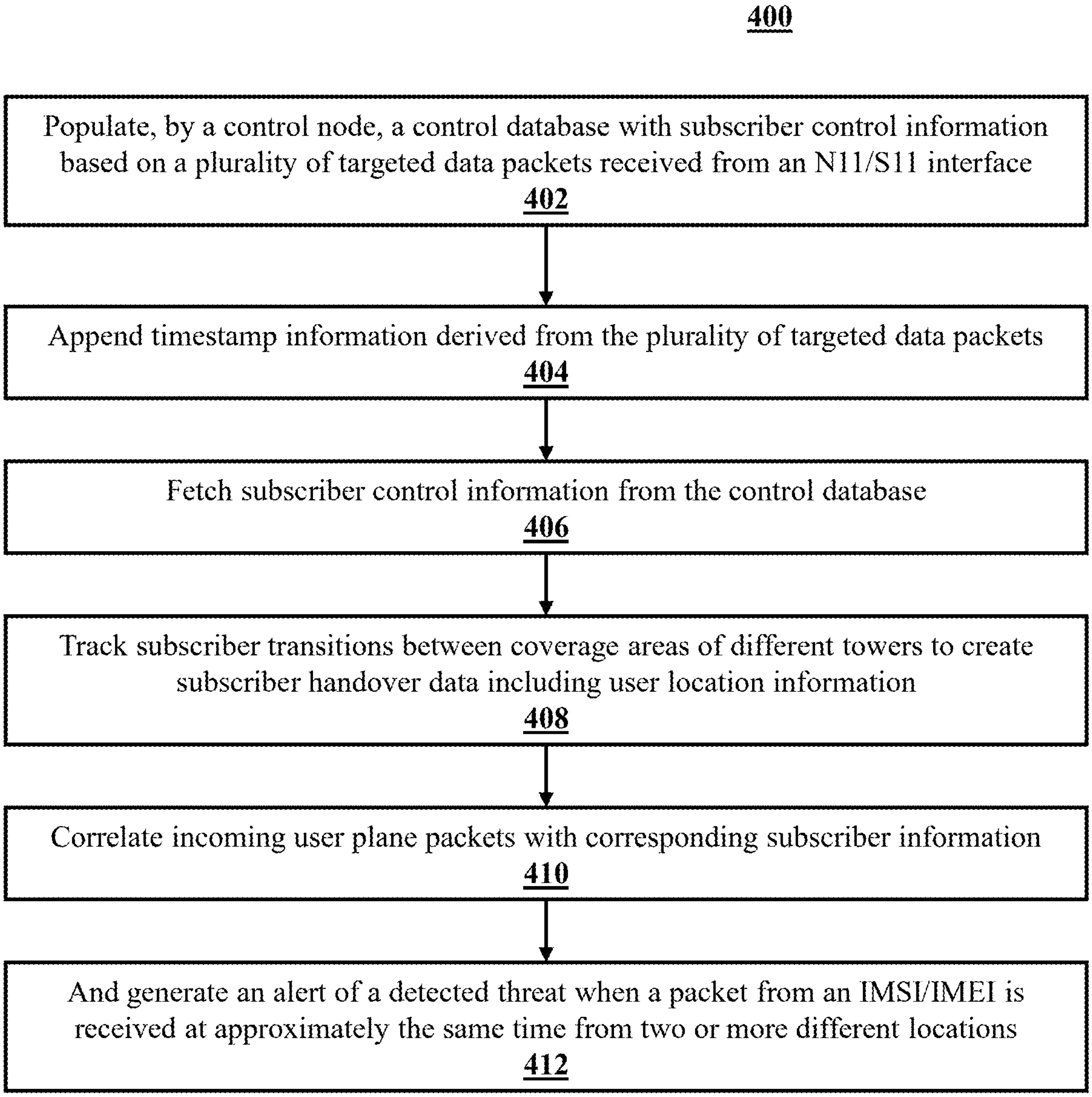
FIG. 4 is a process according to an embodiment of the present disclosure.

FIG. 4 is a flowchart of an example process 400. In some implementations, one or more process blocks of FIG. 4 may be performed by a device.

As shown in FIG. 4, process 400 may include populating, by a control node, a control database with subscriber control information based on a plurality of targeted data packets received from an N11/S11 interface (block 402). An example implementation could involve the control node collecting data packets from subscribers as they move across different network areas and storing this information in a centralized control database, as described above. As also shown in FIG. 4, process 400 may include appending timestamp information derived from the plurality of targeted data packets (block 404). An example implementation might involve each packet received by the control node being tagged with the precise time it was captured, allowing for accurate tracking of subscriber activity. As further shown in FIG. 4, process 400 may include fetching subscriber control information from the control database (block 406). An example implementation could be when a query is made, the control node retrieves the relevant subscriber data, such as their location and activity logs, from the database for analysis. As also shown in FIG. 4, process 400 may include tracking subscriber transitions between coverage areas of different towers to create subscriber handover data including user location information (block 408). An example implementation might involve the control node monitoring subscriber transitions between cell towers, recording details about their location and the time of handover, as described above. As further shown in FIG. 4, process 400 may include correlating incoming user plane packets with corresponding subscriber information (block 410). As also shown in FIG. 4, process 400 may include and generate an alert of a detected threat when a packet from an IMSI/IMEI is received at approximately the same time from two or more separate locations (block 412). For example, a device may generate an alert of a detected threat when a packet from an IMSI/IMEI is received at approximately the same time from two or more different locations, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The invention claimed is:

1. A method for managing subscriber data and detecting a cloned subscriber identity module (SIM) card threat within a telecommunication network, comprising:

populating, by a control node, a control database with subscriber control information based on a plurality of targeted data packets received from an N11/S11 interface;

appending timestamp information derived from the plurality of targeted data packets;

fetching subscriber control information from the control database; tracking subscriber transitions between coverage areas of different towers to create subscriber handover data including user location information; correlating incoming user plane packets with corresponding subscriber information; and generating an alert of a detected cloned SIM card threat when a packet associated with an IMSI/IMEI is received at approximately the same time from two or more different locations, wherein generating the alert comprises: determining whether a handover has occurred; if a handover has occurred, verifying whether current and previous towers are in expected locations by consulting a location database, and generating the alert if a discrepancy is found; and if a handover has not occurred, comparing a timestamp and user location information (ULI) of the packet and generating the alert if the location is found to be different.

2. The method of claim 1, wherein the control node further comprises instructions to verify integrity of the subscriber control information by cross-referencing with a location database.

3. The method of claim 1, wherein the alert generated includes details of the detected threat, including timestamp, location data, and subscriber identity information.

4. The method of claim 1, further comprising the step of updating the control database with resolved discrepancies in user location data upon validation.

5. The method of claim 1, wherein the control node utilizes Handover Identification algorithms to predict potential handover events and pre-emptively update subscriber information.

6. A system for managing subscriber data and detecting a cloned subscriber identity module (SIM) card threat within a telecommunication network comprising:

one or more processors configured to: populate, by a control node, a control database with subscriber control information based on a plurality of targeted data packets received from an N11/S11 interface;

append timestamp information derived from the plurality of targeted data packets; fetch subscriber control information from the control database;

track subscriber transitions between coverage areas of different towers to create subscriber handover data including user location information;

correlate incoming user plane packets with corresponding subscriber information; and generate an alert of a detected cloned SIM card threat when a packet associated with an IMSI/IMEI is received at approximately the same time from two or more different locations, wherein generating the alert comprises: determining whether a handover has occurred; if a handover has occurred, verifying whether current and previous towers are in expected locations by consulting a location database, and generating the alert if a discrepancy is found; and if a handover has not occurred, comparing a timestamp and user location information (ULI) of the packet and generating the alert if the location is found to be different.

7. The system of claim 6, wherein the control node further comprises instructions to verify integrity of the subscriber control information by cross-referencing with a location database.

8. The system of claim 6, wherein the alert generated includes details of the detected threat, including timestamp, location data, and subscriber identity information.

9. The system of claim 6, wherein the one or more processors are further configured to: update the control database with resolved discrepancies in user location data upon validation.

10. The system of claim 6, wherein the control node utilizes Handover Identification algorithms to predict potential handover events and pre-emptively update subscriber information.

11. A non-transitory computer-readable medium storing a set of instructions for managing subscriber data and detecting a cloned subscriber identity module (SIM) card threat within a telecommunication network, the set of instructions comprising:

one or more instructions that, when executed by one or more processors of a device, cause the device to:

populate, by a control node, a control database with subscriber control information based on a plurality of targeted data packets received from an N11/S11 interface;

append timestamp information derived from the plurality of targeted data packets;

fetch subscriber control information from the control database; track subscriber transitions between coverage areas of different towers to create subscriber handover data including user location information; and correlate incoming user plane packets with corresponding subscriber information; and generate an alert of a detected cloned SIM card threat when a packet associated with an IMSI/IMEI is received at approximately the same time from two or more different locations, wherein generating the alert comprises: determining whether a handover has occurred; if a handover has occurred, verifying whether current and previous towers are in expected locations by consulting a location database, and generating the alert if a discrepancy is found; and if a handover has not occurred, comparing a timestamp and user location information (ULI) of the packet and generating the alert if the location is found to be different.

12. The non-transitory computer-readable medium of claim 11, wherein the control node further comprises instructions to verify integrity of the subscriber control information by cross-referencing with a location database.

13. The non-transitory computer-readable medium of claim 11, wherein the alert generated includes details of the detected threat, including timestamp, location data, and subscriber identity information.

14. The non-transitory computer-readable medium of claim 11, wherein the one or more instructions further cause the device to update the control database with resolved discrepancies in user location data upon validation.

15. The non-transitory computer-readable medium of claim 11, wherein the control node utilizes Handover Identification algorithms to predict potential handover events and pre-emptively update subscriber information.

* * * * *